United States Patent [19]

Pethrick et al.

[11] Patent Number: 5,605,035
[45] Date of Patent: Feb. 25, 1997

[54] ROPE WITH STRAIN DAMAGE INDICATOR

[75] Inventors: Richard A. Pethrick, Glasgow; David Wotherspoon, Newtonmore, both of Scotland

[73] Assignees: University of Strathclyde, Glasgow; Bones Ord (Holdings) Ltd., Inverness, both of Scotland

[21] Appl. No.: 182,182

[22] PCT Filed: Jul. 30, 1992

[86] PCT No.: PCT/GB92/01409

§ 371 Date: Feb. 22, 1994

§ 102(e) Date: Feb. 22, 1994

[87] PCT Pub. No.: WO93/03219

PCT Pub. Date: Feb. 18, 1993

[30] Foreign Application Priority Data

Aug. 1, 1991 [GB] United Kingdom ............ 9116626

[51] Int. Cl.⁶ .................... D02G 3/02; D02G 3/36
[52] U.S. Cl. .................. 57/200; 57/210; 57/232; 57/233; 87/1; 87/6; 87/9; 116/207; 374/106
[58] Field of Search ............ 57/200, 210, 232, 57/233; 87/1, 6, 8, 9; 116/207; 374/106

[56] References Cited

U.S. PATENT DOCUMENTS

| 3,030,851 | 4/1962 | Meyer | 87/6 |
| 3,036,490 | 5/1962 | Muller et al. | 87/6 |
| 4,016,019 | 4/1977 | Norris | 116/207 X |
| 4,151,748 | 5/1979 | Baum | 116/207 X |
| 4,640,178 | 2/1987 | Kurzbock | 87/1 X |

FOREIGN PATENT DOCUMENTS

| 684029 | 1/1967 | Belgium . |
| 1059373 | 5/1954 | France ........ 116/212 |
| 2402736 | 5/1979 | France ........ 87/6 |
| 358473 | 11/1931 | United Kingdom . |
| 1413200 | 11/1975 | United Kingdom . |
| 2130611 | 6/1984 | United Kingdom . |
| 2152088 | 7/1985 | United Kingdom . |
| 2194256 | 3/1988 | United Kingdom . |

*Primary Examiner*—William Stryjewski
*Attorney, Agent, or Firm*—Bell, Seltzer, Park & Gibson, P.A.

[57] ABSTRACT

A rope including a heat sensitive component which is subject to a visible change in appearance, such as a color change, when exposed to a selected elevated temperature resulting from a strain-related heat release from the rope. The heat sensitive coating may be contained in a coating over a fiber of the rope or a rope strand, or may be incorporated in sheath located over the load-bearing core of the rope.

14 Claims, 1 Drawing Sheet

ROPE WITH STRAIN DAMAGE INDICATOR

FIELD OF THE INVENTION

This invention relates to improvements in and relating to ropes, and in particular to the identification of strain damage to rope. The term ropes as used herein is intended to encompass ropes, cords, webbing and the like.

BACKGROUND OF THE INVENTION

Ropes and harnesses play an important role in personal protection for use in areas such as rock climbing, parachuting and in industrial applications. These supports are designed to operate under two forms of loading: normal static loading in which they are exposed to operational design loads; and shock loads which occur, for example, after a fall.

Ropes for use in these applications are typically classified as possessing certain properties, such as maximum safe loading, elongation under load, and shock load strength. Under normal usage many ropes will retain these properties for a considerable time. However, when subject to loads above the yield point of the rope, damage may occur which would seriously reduce the performance of the rope in further safety critical events.

Unfortunately, the occurrence of such damage to a rope may not be readily apparent from a visual inspection of the rope. On the one hand, this may result in the continued use of a damaged rope if, for example, a fall on a rope is not reported or recorded. On the other hand, ropes may be discarded as a cautionary measure after a minor fall which has not actually resulted in any damage to the rope.

Damage may also occur to ropes under less dramatic circumstances, such as if the rope is bent over a small radius and loaded.

Various means have been proposed for providing an indication of damage to ropes and webs. In U.K. Patent No. 1,413,200 to Takata Kojyo Co., Ltd., there is disclosed a strain indicating web for use in a safety belt. Indicator threads of different colour from the web are provided and have an elongation to rupture below that of the ground warps of the web, such that elongation of the web beyond a predetermined value results in rupture of the indicator threads. In U.K. Patent Application No. 2,130,611A to Thurston, a synthetic fibre rope is disclosed which includes a number of monitoring optical plastic fibres. The fibres are selected such that when subjected to the nigh local strains associated with damage to the rope their optical conductivity is destroyed or reduced, to provide a warning of impairment. U.K. Patent Application No. 2152088A to Bridon plc (United Kingdom) discloses a fibre rope incorporating at least one electrical, optical, of fluid transmission element, such as a carbon fibre yarn whose mechanical properties approximate to those of the rope. Failure of the rope can be detected by testing whether the transmission element transmits a signal or matter. In U.K. Patent No. 2194256B to Hutchings, webbing strap or rope is disclosed which incorporates material which is subject to stress-whitening under predetermined loads. The stress-whitening material may be provided in the form of a patch, label or sleeve or may be in the form of one or more strands or threads pleated, woven or braided into the rope.

All of the disclosures contained in the above noted patent documents require the incorporation of separate strands or fibres into the rope or web, which complicates the manufacture of the rope and possibly affects its properties. The Hutchings patent discloses the use of patches, labels and sleeves which could be separately fixed to the web or rope after manufacture but would only provide an indication of damage to the rope at the site of the patch, label or sleeve.

Further, these various proposals rely on the behaviour of a strain indicating thread, fibre or element, rather than the actual load bearing fibres of the rope or belt and it may be difficult to ensure that the strain indicating element is subject to the same load conditions as the rope.

It is one of the objects of the present invention to provide a rope, web or the like which obviates and mitigates these disadvantages.

SUMMARY OF THE INVENTION

According to one aspect of the present invention there is provided a rope including a heat sensitive component which is subject to a visible change in appearance when exposed to a selected elevated temperature resulting from a strain related heat release from the rope.

When the rope is subject to stress which results in strain damage, the strain levels in the damaged portion of the rope, where yield occurs, cause a localized rise in temperature. Though not wishing to be bound by theory it is believed that the rise in temperature occurs as a result of stress induced reorganization in the structure of the rope fibre and of friction between rope fibres. Using the present invention, such areas of damage and reduced load bearing ability are rendered visible by the change in appearance of the heat sensitive component. Strain damage may occur where the rope is bent over a small radius and loaded, or where the rope is subject to a high static load or a shock load.

Preferably, the heat sensitive component is transparent, but on attaining a threshold temperature the component changes colour, which change in colour may be readily identified on inspection of the rope.

Preferably also, the heat sensitive component includes a two-part dye mechanism formed of an activator which, on heating above a selected elevated temperature causes activation of a dye material and causes a change in colour of the dye material. Most preferably the activator is phenol based and is used in conjunction with a cyanine dye.

The heat sensitive component may be contained within a substrate or matrix which may be applied to one or more yarns or individual fibres which form the rope. Alternatively, the heat sensitive component may be applied as an overcoating to one or more strands of the rope.

The threshold temperature of the heat sensitive component may be varied to suit the rope design, rope application, and expected or acceptable damage levels.

Preferably, the heat sensitive component is provided on an external sheath of the rope, thus not affecting the load bearing capabilities of the rope. The sensitivity of the present invention is also not affected by providing the heat sensitive component on the exterior of the rope as tests have shown that the strain related heat release is most pronounced in the outer portion of the rope. The present invention is thus ideally suited for use in climbing ropes having a core of side-by-side or braided polypropylene tapes over which a protective sheath is braided, each tape comprising a large number of side-by-side strands or fibres.

When the heat sensitive component is provided on an external sheath formed of a plurality of braided tapes, one or more of the tapes may be coated with the heat sensitive component. Preferably, the heat sensitive coating is provided with a protective overcoating to inhibit triggering of a change in appearance of the heat sensitive coating by external factors, such as exposure to chemicals or exposure to sunlight. The heat sensitive coating is preferably water based and may be air dried after application while the overcoating is polymer based and may also be air dried after application.

Preferably, the visible change in appearance of the heat sensitive component occurs on exposure of temperatures in the range of approximately 100°–110° C.

According to a further aspect of the present invention there is provided a method of indicating strain damage in a rope comprising incorporating a heat sensitive component in a rope, which heat sensitive component is subject to a visible change in appearance when exposed to a selected elevated temperature resulting from a strain related heat release from the rope material.

BRIEF DESCRIPTION OF THE DRAWINGS

These and other aspects of the present invention will now be described, by way of example, with reference to the accompanying drawings in which.

DETAILED DESCRIPTION OF DRAWINGS

Figure 1:
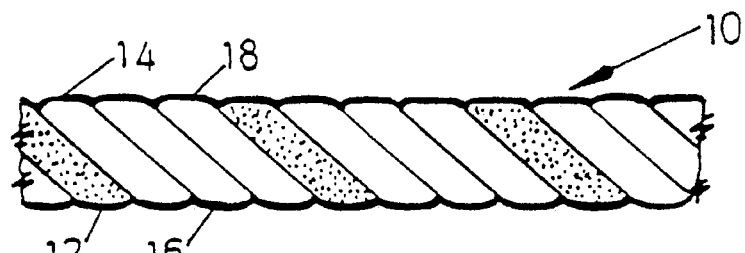
FIG. 1 is a view of a portion of a rope in accordance with a first embodiment of the present invention.

Reference is first made to FIG. 1 of the drawings, which shows a portion of rope 10, in accordance with a first embodiment of the present invention. The rope 10 is formed of four strands 12, 14, 16, 18, each strand comprising a plurality of fibres. One of the strands 12 is coated with a normally transparent heat sensitive component which is subject to a colour change when subject to a selected elevated temperature corresponding to the temperature that would be experienced by the component from a yield related heat release; it is believed that the heat release occurs when the rope fibres are subject to a stress sufficient to cause yield, the heat release resulting from a stress induced reorganisation in the fibre structure, and also from friction between the rope fibres. This heat release is particularly pronounced in nylon and polypropylene and thus the present invention has particular utility for use with nylon or polypropylene ropes and webbing.

In this example the heat sensitive component is in the form of a two part dye mechanism containing a cyanine and a phenol based activator. The dye and activator are bound together by a suitable matrix. When the component is heated above a threshold temperature the activator causes activation of the normally transparent cyanine dye to change colour.

The activator and the dye are selected such that the threshold temperature is above the strain induced elevated temperatures which the rope is intended to experience in normal use without sustaining damage. Also, the colour of the dye should not alter over time, though in certain circumstances such a feature may be desirable where, for example, ropes are to be replaced, irrespective of other factors, after a predetermined period of time has elapsed. In these circumstances the elapsing of the replacement period could be indicated by a change in the colour of the dye.

When the rope 10 is subject to a high static load or a shock load above the yield stress of the rope, the outer portion of the rope subject to the stress will be subject to a sharp rise in temperature, typically to 100°–110° C., sufficient to locally change the colour of the dye. It is then clearly evident, through visual inspection, that the rope 10 has sustained damage, and the rope may be discarded.

Also, where the rope passes over a sharp radius, typically around 5 millimetres or less, the local strain concentration can result in relatively high strain levels, which may result in damage to the rope. In such circumstances it is likely to be not readily apparent to the rope users that damage may have occurred, though subsequent visual inspection of the rope will reveal the portion of the rope where damage has occurred.

The ability of the present invention to pinpoint the part of the rope where damage has occurred may alert the rope users to practices which are likely to cause damage. Also, in certain circumstances a clear indication of the area of damage may allow the remaining, undamaged part of the rope to be salvaged, rather than being discarded.

Further, in this example, as the heat sensitive component is preferably an integral part of the rope, this prevents unscrupulous persons from passing off damaged rope as rope which is still safe to use, as any damage to the rope will be readily apparent.

Figure 2:
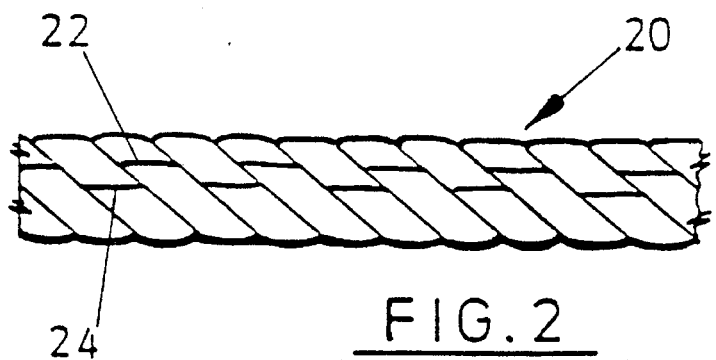
FIG. 2 is a view of a rope in accordance with a second embodiment of the present invention.

Reference is now made to FIG. 2 of the drawings which shows a further rope 20 in which individual fibres 22,24 of the rope have been coated with the heat sensitive component, which changes colour when the individual coated fibres 22,24 are subject to heating as a result of yield occurring in the coated fibres, or in adjacent fibres.

It should be noted that FIGS. 1 and 2 are merely illustrative of the general principle of the present invention. Ropes are manufactured in many different configurations, for example climbing ropes are commonly braided in a manner specific to shock loading requirements, many of which could be adapted to incorporate aspects of the present invention. However, it should be noted that certain rope constructions may not display the appropriate temperature response to shock loading necessary for activation of the heat sensitive component, thus precluding use of the present invention in combination with such ropes.

Figure 3:
FIG. 3 is a view of webbing in accordance with a third embodiment of the present invention.

FIG. 3 of the drawings illustrates a length of webbing 30 including two lines of fibres 32,34 incorporating the heat sensitive component. Such webbing 30 could be employed in, for example, vehicle seat belts or in safety harnesses. When the webbing 30 is subject to damaging stress the lines 32,34 change colour and indicate the occurrence and location of the damage.

Figure 4:
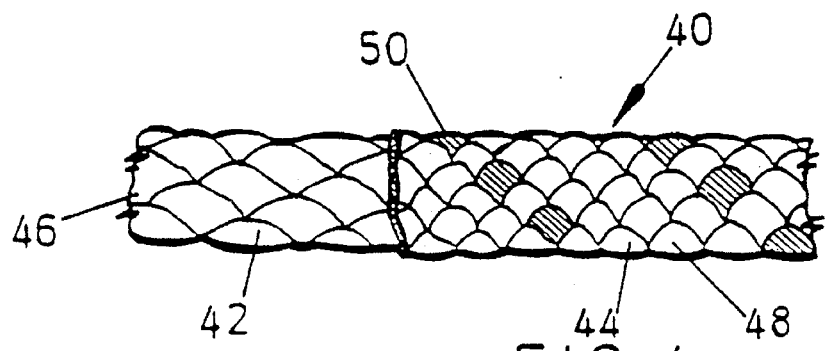
FIG. 4 is a view of a rope in accordance with a fourth preferred embodiment of the present invention.

Reference is now made to FIG. 4 of the drawings, which shows a climbing rope 40 in accordance with a fourth, preferred embodiment of the present invention. In contrast to the previously described embodiments, the heat sensitive component is not incorporated in the load bearing portion of the rope 40, as will be described.

The rope 40, comprises a core 42 and a protective sheath 44, each formed of a number of tapes, each tape comprising a large number of fibre strands laid side-by-side. The core 42 is of conventional construction, comprising a plurality of braided polypropylene tapes 46. The sheath 44 is also of conventional construction, comprising a plurality of braided tapes 48, however one of the tapes 50 is coated with a heat sensitive material.

Prior to braiding, the tape 50 is passed through a bath containing a water based heat sensitive material to coat the tape 50, which is then air dried. The coated tape 50 is then passed through a further bath containing a liquid polymer based material which is air dried or cured to provide an overcoating to protect the heat sensitive coating from chemical attack.

In this form of rope it is the core 42 which carries the load and thus the heat sensitive tape 50 reacts to rises in temperature in the fibres of the core 42. Thus, it is not necessary for the sheath 44 to be subject to the same strains as the core 42, merely that the core 42 and sheath 44 are in contact such that the heat generated in the core 42 acts upon the sheath 44.

It will be evident from the above described embodiments that the present invention is readily incorporated in ropes, webbing and the like simply by coating selected portions of the rope with the heat sensitive material. It would be possible to coat an entire rope in the heat sensitive material, although it is preferred that only portions of the rope are coated, as the contrast in colours between a coloured portion of the rope and an uncoloured portion of the rope is more easily visible on inspection of the rope.

It will be clear to those of skill in the art that the above description is merely exemplary of the present invention and that various changes and modifications may be made to the above noted examples without departing from the scope of the invention.

We claim:

1. A rope including a heat sensitive component which is subject to a visible change in appearance when exposed to a selected elevated temperature resulting from a strain related heat release from the rope.

2. The rope of claim 1 in which the heat sensitive component changes color when subject to said selected elevated temperature.

3. The rope of claim 1 in which the heat sensitive component is transparent before being subjected to said selected elevated temperature.

4. The rope of claim 1 in which the heat sensitive component comprises a two-part dye mechanism which includes an activator and a dye, and wherein upon the activator being heated above said selected elevated temperature, it causes activation of the dye and a change in color of the dye.

5. The rope of claim 4 which the activator is phenol based and is used in conjunction with a cyanine dye.

6. The rope of claim 1 wherein the rope comprises a plurality of individual fibers, and wherein the heat sensitive component is applied to at least one of said fibers.

7. The rope of claim 1 wherein the heat sensitive component extends along the full length of the rope.

8. The rope of claim 1 wherein the rope comprises a load bearing core and an external sheath, and wherein the heat sensitive component is provided on the external sheath.

9. The rope of claim 8 wherein the rope comprises a core of side-by-side or braided tapes over which a protective sheath of tapes is braided, each tape comprising a large number of side-by-side strands or fibers, and wherein one or more of the tapes of the sheath is coated with a material containing the heat sensitive component.

10. The rope of claim 9 wherein the heat sensitive containing coating is provided with a protective overcoating to inhibit triggering of a change in appearance of the heat sensitive component by factors other than elevated temperature.

11. The rope of claim 10 in wherein the heat sensitive component containing coating is water based and the overcoating is polymer based.

12. The rope of claim 1 wherein the visible change in appearance of the heat: sensitive component occurs on exposure to temperatures in the range of approximately 100°–110° C.

13. A method of indicating strain damage in a rope comprising the step of incorporating a heat sensitive component in the rope, which heat sensitive component is subject to a visible change in appearance when exposed to a selected elevated temperature resulting from a strain related heat release from the rope.

14. A method of making a rope including the step of coating a component of the rope with a material which includes a heat sensitive component which is subject to a visible change in appearance when exposed to a selected elevated temperature.

\* \* \* \* \*